April 12, 1955 W. A. WOOTTEN 2,706,218

SYSTEM FOR TELEVISION-PROGRAM FILM RECORDING AND RECORD REPRODUCTION

Filed Nov. 15, 1949 2 Sheets-Sheet 1

INVENTOR.
WILLIAM A. WOOTTEN
BY Forrest J. Lilly
ATTORNEY

April 12, 1955

Filed Nov. 15, 1949

W. A. WOOTTEN

SYSTEM FOR TELEVISION-PROGRAM FILM RECORDING AND RECORD REPRODUCTION 2,706,218

2 Sheets-Sheet 2

INVENTOR.
WILLIAM A. WOOTTEN

BY Forrest J. Lilly

ATTORNEY

United States Patent Office 2,706,218

Patented Apr. 12, 1955

2,706,218

SYSTEM FOR TELEVISION-PROGRAM FILM RECORDING AND RECORD REPRODUCTION

William A. Wootten, Los Angeles, Calif.

Application November 15, 1949, Serial No. 127,421

8 Claims. (Cl. 178—5.8)

This invention relates generally to the art of television program reproduction, and deals in particular with the making of a motion picture film corresponding to a live television broadcast of a continuous program. Such motion picture film may subsequently be projected as a motion picture, or broadcast as a subsequent television program which reproduces the original live broadcast.

In television broadcasting of live programs, it is conventional to employ a plurality of television cameras, viz., three to five, located at different distances and angles from the action or field of view. Television receivers corresponding to these cameras are located in a control room, occupied usually by a dramatic director and a technical director. Without going into a detailed discussion of procedures now well understood in the art, the dramatic director and technical director, observing on their receiving equipment the fields of view being picked up by the several television cameras, select the particular field of view to be broadcast at any given time, and operate switching mechanism which connects to the television broadcasting system the particular television camera corresponding with the selected field of view. This switching mechanism is of course operated from time to time to shift from camera to camera, thus shifting from longshot to close-up views, or to different camera angles.

Thus the program broadcast is actually a composite of sequences as viewed by different television cameras. If a motion picture camera is operated in connection with each television camera, and if the program as broadcast is photographed in a camera trained on a television viewing screen, the films so obtained may, by appropriate comparison, cutting and splicing, be employed to piece out a final film corresponding precisely to the television broadcast. It might be mentioned in passing that the negative film record obtained by exposing a camera to the television viewing screen is inevitably inferior in quality to the negatives which can be obtained by photographing the live program, and it is accordingly one purpose of the present invention to produce a film record by photographing the live program rather than a television screen.

The procedure described in the preceding paragraph is fully operable, and produces a satisfactory final film record. However, it is time consuming and expensive, and it is a primary purpose of the present invention to provide a simplified procedure for producing the desired film record of the broadcast program.

According to the invention, there is employed a motion picture camera in connection with each television camera, as in the process hereinbefore outlined. There is also employed a cue film, driven intermittently, in synchronism with the motion picture cameras. At each shift from one camera station to another, the technical director performs an operation which makes an identifying mark or indicia, preferably a punch mark, on the frame of this cue film then located at a "marking station," and which frame corresponds to the particular film frame then before the exposure aperture in the motion picture camera located at the camera station to which the shift is being made. This mark preferably consists of a hole punched through the proper film frame in a predetermined position therein. There is one unique punch position in the frame of the cue film for each camera, so that inspection of a punched film frame would reveal by the position of the punch hole that a shift was made to a corresponding camera station at the time when that film frame was located at the marking or punching station.

The negative films from the several motion picture cameras are developed, and then run through a plurality of synchronously operated optical printer heads all designed to print onto a single positive film. The previously made cue film is at this time employed to control the plurality of printers, the markings on the cue film originally made to correspond with the shifts from camera station to camera station now serving to control the printers so that they will print successively onto the new raw positive film in exact accordance with the shifts which were made from camera station to camera station during the broadcast. Thus, while the printers are simultaneously operated, only the portions of the negative films carried by each which correspond to the actual live broadcast will be printed on the new positive, and the result is a positive print, without cutting and splicing, which carries the program exactly as broadcast. The invention will be more fully understood from the following detailed description of a simple exemplification thereof, reference for this purpose being had to the accompanying drawings, in which:

Figures 1A and 1B, taken together, show schematically a system in accordance with the invention;

Figure 1A:
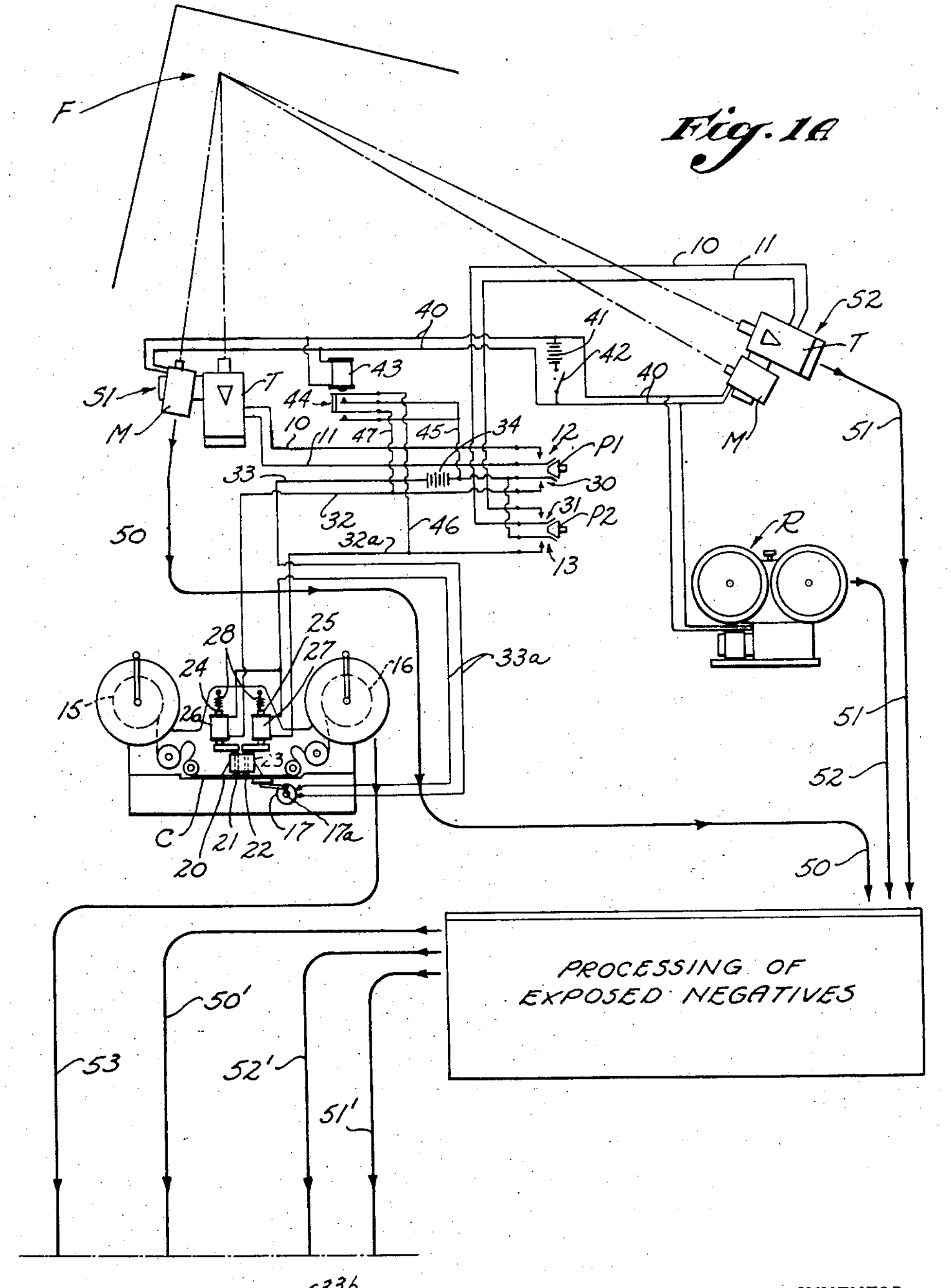
Figure 6:
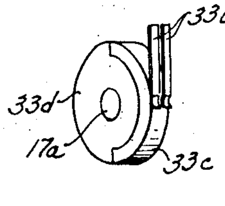
Figure 6 is a diagrammatic perspective of a rotary synchronizing switch.

But two camera stations S1 and S2 are illustrated in the drawings, but these will be understood as representative of however many may be employed in practice, such as three, four or five. At each of these camera stations is a suitable television camera T and a motion picture camera M, all cameras being trained and focussed on the scene, stage, or field of view F. Each motion picture camera will be understood as properly correlated as for field of view, area framed, and focussing, with the corresponding television camera. In addition, a conventional sound recorder R of the film type is employed.

The television broadcasting equipment is not illustrated, as it may be entirely conventional. Also not illustrated are the control room viewing screens where the scenes picked up by the several television cameras are reproduced, it being understood that the dramatic and technical directors, by viewing such screens, are enabled to select the best camera station for broadcast, and to make changes, from time to time, from one camera station to another which may have acquired superior position. These screens and their use are conventional, and hence need not be further described or illustrated.

Each television camera T is understood to include a usual control circuit by which that camera is conditioned and cut into circuit with the broadcasting equipment to broadcast the program viewed by said camera, and since such circuiting is also conventional, it is not illustrated herein, beyond to show the individual control switch circuits 10, 11 for the cameras T. The circuit 10, 11 for camera T at station S1 is conventionally shown as controlled by a self-locking push button switch 12, and the circuit 10, 11 for camera T at station S2 is similarly shown as controlled by a self-locking push button switch 13, and it will be understood that depression of the push button P1 will close switch 12 to put camera T at station S1 on the air, while depression of push button P2 will close switch 13 to put camera T at station S2 on the air. These push button switches are of a conventional type which stay in their depressed position until the next or alternate push button is depressed.

A cue film C is employed, and is driven from supply roll 15 to take up roll 16 by means of suitable constant speed sprockets and an intermittent film movement mechanism 17, which is synchronized with the conventional intermittent film movement mechanisms in the motion picture cameras M. The details of such intermittent mechanisms are known, and need not be explained herein. Suffice it to say that they advance the negative films in the cameras M and the film strip C in synchronous relation with one another, all being, for example, powered by synchronous motors, not shown. Cue film C is thus moved over a guide plate 20 by intermittent movement 17. At a marking station located along and over this guide plate is a means for making identifying marks on the cue film C, and this means consists preferably of a plurality of solenoid operated punches 21 and 22, one for each camera M. The two punches are located in different positions with reference to a given film frame arrested by the intermittent movement at the marking or punching station, so that the location of a punch hole in a film frame of the cue film C will correspond with or identify a particular one of the cameras M. As here indicated, the punches 21 and 22 pass through a punch guide member 23 to engage the film, and the film guide plate 20 will be understood to be suitably perforated in line with the punches to permit the latter to pass through. The upper ends of the punches are mounted on the lower ends of the plungers 24 and 25 of solenoids 26 and 27, respectively, and said plungers are conventionally indicated as provided with quick-acting return springs 28 which elevate the plungers and punches after they have been depressed to punch the film by energization of the solenoids.

The solenoids are energized automatically by depression of the previously mentioned push buttons P1 and P2. Thus said push buttons, when depressed, also close switches 30 and 31, respectively, the former closing a circuit lead 32 connected to one terminal of solenoid 36 with a common battery lead 33, which lead includes battery 34 and branches to go to the other terminal of solenoid 26, as well as to one terminal of solenoid 27; while switch 31 closes circuit lead **32*a* from the other terminal of solenoid 27 with common battery lead 33. Lead 33 preferably includes a loop 33*a* going to contacts 33*b* adapted to be intermittently closed by a shorting sector 33*c* forming a portion of an insulation disk 33*d* which may be mounted on the shaft 17*a* of intermittent film movement 17. The sector 33*c* is so located on shaft 17 as to short the contacts 33*b*** while the intermittent movement is disengaged from the film. Hence, the solenoids for operating the punches can be energized only while the cue film is stationary. Thus, depression of either of the push buttons P1 or P2 not only cuts in the corresponding television camera to go on the air, but results in actuating the corresponding punch to make a punch hole in the cue film C. Because the punches are located in different positions with respect to the cue film frame arrested at the punching station, a given punch hole reliably indicates the fact that one or the other of the cameras T went on the air at the instant the cue film frame bearing the punch hole was at the punching station. Therefore, the punch marks in the cue film will form a record of all shifts from camera station to camera station during the broadcasting of the continuous program at the stage of field of view F.

Figures 2, 3, 4, 5:
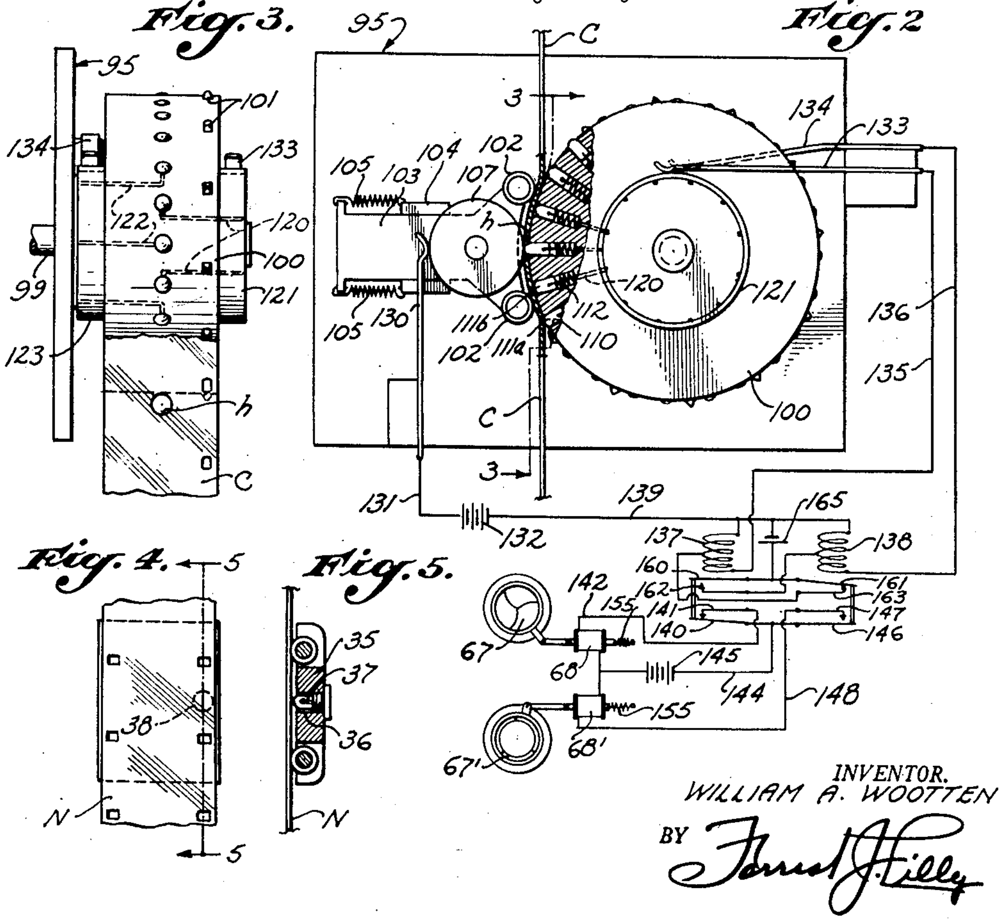
Figure 2 is a side elevation, with parts fragmentarily broken away, showing a portion of the apparatus of Figure 1B.
Figure 3 is a section taken in accordance with line 3—3 of Figure 2.
Figure 4 is a detailed view of a camera pressure plate employed in the motion picture cameras and sound recorders.
Figure 5 is a section taken on line 5—5 of Figure 4.

For proper and convenient use of the cue film, it is also important to make correlated starting marks on all films, i. e., on the negatives in the cameras M, on the negative in recorder R, and on the cue film C. For this purpose, the aperture plate of each camera M is preferably equipped with a "grain-of-wheat" lamp capable of making an identifying exposure mark on the margin of the negative. Figures 4 and 5 show the roller pressure-plate 35 of a typical motion picture camera, understood as located immediately in back of negative film N in line with the usual aperture plate (not shown). This pressure plate is formed, in line with the row of perforations along one edge of the film, with a bore or socket 36 to receive lamp 37, and this lamp, when lighted, will make an exposure 38 on the film which will later serve as a starting mark. Similar provisions will be made in sound recorder R. These lamps are provided with a common energizing circuit 40, powered by battery 41 and controlled by a single switch 42. Connected across circuit 40 is a solenoid 43 which, when energized, closes a double pole switch 44 operating through circuit leads 45, 46 and 47 to connect battery 41 to the energizing circuits for punch operating solenoids 26 and 27. Closure of switch 42 accordingly simultaneously makes exposure marks on the negative films in the cameras and sound recorder, and punch holes in cue film C. By these correlated marks the negatives and cue film may be correlated and properly started together in the subsequent printing operation.

Figure 1B:
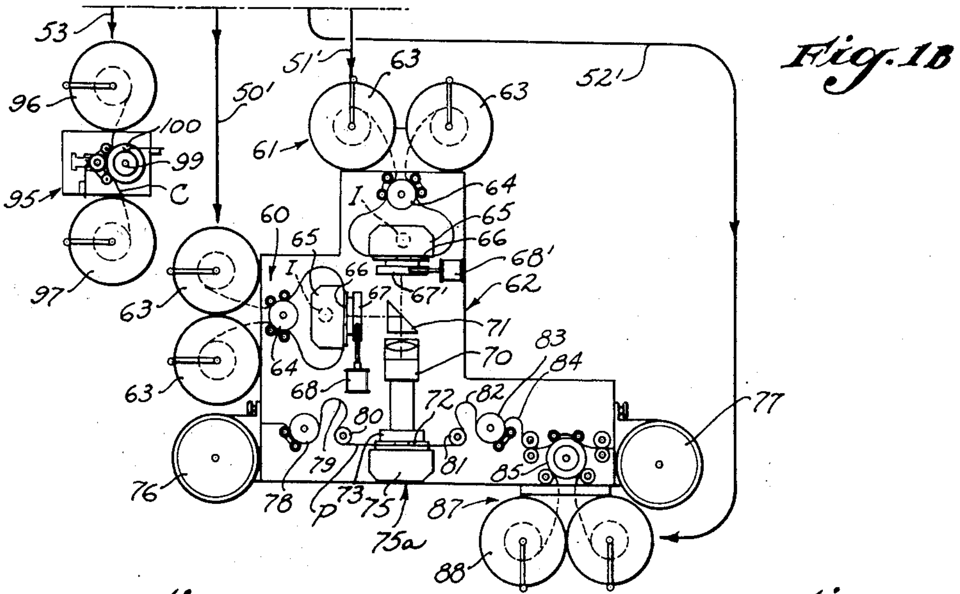

Figure 1A indicates by the flow lines 50, 51 and 52 that the negative films from the cameras M and the recorder R are then processed, and the developed negatives together with the punched cue film then go to the printing process, as indicated by lines 50', 51', 52' and 53 in both Figures 1A and 1B.

While various forms of printing equipment may be employed for the printing operation to be described, one preferred type having many unique features will be diagrammatically shown and described.

A plurality of printer heads, such as 60 and 61, are employed, one for each negative picture film, and all mounted on a suitable frame, such as indicated at 62. Each of these printer heads includes conventional supporting means 63 for supply and take-up film rolls, sprocket 64 for constantly driving the film both to and from the magazine, and a conventional intermittent film movement mechanism 65 for intermittently advancing the film past aperture plate 66, all understood to be operated in synchronism. In front of the aperture plates for the printers 60 and 61 are shutters 67 and 67', respectively, operated through suitable linkage from corresponding solenoids 68 and 68' (see also Figure 2). Lamp means conventionally indicated at I serve to illuminate the films. A common projection lens at 70 views the films at the aperture plates of both printer heads by means of prism 71, and projects an image thereof through aperture plate 72 behind which is located the raw stock positive film P. A conventional shutter is located at 73, just in front of the film passing before aperture plate 72. The film P is intermittently advanced, in synchronism with the negative films in printer heads 60 and 61, by means of intermittent film movement mechanism 75 of printer head **75*a*, and this raw stock positive film P is supplied from a magazine 76 mounted on frame 62 and is taken up into a take-up magazine 77 also here shown as mounted on the same frame. Between magazine 76 and intermittent movement 75, the film is advanced by means of constant speed sprocket 78, and the film is formed with a loop 79 between said sprocket 78 and an idler sprocket 81 located immediately ahead of intermittent movement 75. An idler sprocket 81 located immediately beyond intermittent movement 75 guides the film to loop 82, whence it is taken up and advanced at constant speed by sprocket 83. Beyond the latter is another film loop 84, and the film is taken from said loop and fed over the sprocket 85 of a presently mentioned sound recorder printer, and from there into take-up magazine 77**.

As shown, the printer also includes sound record printer head 87 operating on the film between loop 84 and take-up magazine 77. This printer head includes magazine 88 for the sound record negative made in recorder R, and said negative is passed around sprocket 85 in contact with raw positive film P. The sprocket wheel 85 is of the usual type employed in sound record printers, being open between its side flanges to accommodate optical means for directing the necessary light beam onto the films. These provisions are conventional in the art and need not be further explained or illustrated herein.

Also forming a component of the printing system is a printer control unit 95 through which passes cue film C. This control unit includes supporting means for film supply and take-up rolls 96 and 97 for the cue film, and an intermediate housing in which is located drive mechanism and suitable motor means (not shown, but understood to be synchronized with the film driving means of the printer and recorder heads on frame 62) for powering a constantly rotating shaft 99 on which is mounted insulation drum 100 bearing sprocket teeth 101 for the film C. The film C is pressed against the periphery of this drum 100 by pressure rollers 102 carried by a frame 103 mounted in a guide 104 and pressed forwardly by springs 105. Also carried by frame 103 is electrically conductive contactor wheel or drum 107 which bears on the film opposite the drum. The drum is formed with a plurality of radial sockets 110 for electrically conductive plungers **111*a* and 111*b* which normally slightly project from the periphery of the drum, being spring-pressed in an outward direction by coil springs 112 lodged in the lower end portions of the sockets. These spring pressed plungers 111***a* and 111*b* aline with the punch holes formed in cue film C by punches 21 and 22, such as punch hole *h* in Figure 3. Also, the plungers are formed in sets, in this instance successive pairs 111*a* and 111*b*, to correlate respectively with the positions of the punch holes made at the punching station by the punches 21 and 22. The film C is fed onto the sprocket teeth of the drum 100 in such a way that its successive frames aline with successive frame areas on the periphery of the drum. That is to say, punch holes *h* made by punch 21 are to register with plungers 111*a*, and punch holes *h* made by punch 22 are to register with plungers 111*b*. Thus it will be understood that, for the purpose of the present embodiment, each such frame area of the drum (defined for instance by the drum area between successive sprocket teeth) will have one each of the spring pressed plungers 111*a* and 111*b*, located therein in correspondence with the positions of the two punches 21 and 22 with reference to the frame area arrested at the punching station for the purpose of the punching operation. For example, if the punches 21 and 22 are arranged in tandem across the film frame the punches 111*a* and 111*b* will similarly be arranged in tandem, and at similar spacing. Accordingly, assuming one of the punches, say 21, to have been operated to punch a hole in the cue film in accordance with the operation of cutting the camera station S1 into use, the punch hole so made will register with a corresponding spring-pressed plunger 111*a* of the drum 100 (see Figure 2). This plunger, under actuation by its spring 112, will move through the punch hole in the film to make contact with the conductive drum 107 and so complete a presently described electrical circuit which controls the operation of the printer system as will appear.

The plungers 111*a* corresponding to one of the punches, say 21, are all connected through conductors 120 to a collector ring 121 at one side of drum 100, and the alternate plungers 111*b* are all connected by similar conductors 122 to a collector ring 123 at the other side of drum 100. It will be understood that the conductors 120 and 122 are connected to the plungers through the springs 112. A brush 130 bearing on drum 107 is connected by wire 131 to one side of battery 132, and brushes 133 and 134 bearing on collector rings 121, 123, respectively, are connected by leads 135 and 136, respectively, to the corresponding ends of the coils of respective relays 137 and 138. The other ends of said coils are connected by lead 139 to battery 132.

A normally open movable contact 140 of relay 137 operates, when the relay is energized, to close with stationary contact 141 to close a circuit consisting of lead 142, shutter operating solenoid 68', and common battery lead 144 including battery 145. Similarly, the normally open movable contact 146 of relay 138 moves, when the relay is energized, to close with stationary contact 147, thereby closing a circuit consisting of lead 148 going to shutter operating solenoid 68 and the same common battery lead 144.

Hence, upon registration of a spring actuated plunger 111*a* or 111*b* of drum 100 with a punch hole in cue film C, a circuit is made from said plunger through the hole in the film to the conductive roller 107, and this circuit energizes either relay 137 or 138, depending upon whether the plunger 111 was one of the series connected to collector ring 121 or of the series connected to collector ring 123. Energization of this relay then operates the corresponding relay contacts to energize the corresponding shutter operating solenoid 68 or 68', as the case may be. As diagrammed in Figure 2, the plungers of these solenoids move, when the solenoids are energized, against return springs 155 to operate the shutter mechanisms 67 and 67'.

In order to keep the shutter solenoids energized, it is necessary to provide some means for locking the relays 137 and 138 closed after energization, it being evident that said relays will only be momentarily energized as a punch hole in the cue film passes over the drum. Accordingly, relays 137 and 138 have additional movable contacts 160 and 161, respectively, adapted when the relay coils are energized to close with respective stationary contacts 162 and 163. Contacts 160 and 161 are connected to one side of a battery 165, the other side of which is connected to the ends of the coils of relays 137 and 138, as indicated. Contact 162 of relay 137 is connected to the midpoint of the coil of relay 138, and contact 163 is connected to the midpoint of the coil of relay 137. It will be seen that with relay 137 energized and relay 138 de-energized, for example, battery 165 will be connected across a portion of the coil of relay 137, and will create enough magnetic force to hold said relay 137 closed even though its main battery circuit 139 be opened. The relay 137 accordingly remains locked closed after departure of the punch hole in the cue film from the drum, and the shutter-solenoid 68 hence stays energized until such time as another punch hole in the cue film operates to energize the other relay.

Thus it will be understood that the cue film C will control and determine which of the printers 60 and 61 is to be operative at any given time to print onto the positive P. It will of course be appreciated that the films in the printers 60 and 61, in sound printer 87, and the cue film C in control unit 95, will all be correlated at the start by means of the previously described starting marks and punch holes, so that all will travel synchronously and in precise step with one another through the printer and the control unit. This is readily accomplished by preliminary adjustments of the several films within the several pieces of apparatus in such a way that the correlating starting marks and holes are all correspondingly related to the several printing apertures, or the drum 100, as the case may be. The sound record film in recorder 87 must of course be properly adjusted with regard to its starting mark in view of the fact that it is printed onto the new positive at a known distance (conventionally twenty-six frames) from the picture printing aperture. Also, as will be readily apparent, the cue film drum 100 should be so synchronized with the shutter 73 for the printer head 75*a* that the shutters 67 and 67' for the printer heads 60 and 61 will be actuated by the cue film while the shutter 72 is closed for movement of the film P by its intermittent mechanism. This is easily arranged in practice simply by appropriate correlation of the starting positions of the drum 100 and the intermittent film advancing means of the printer heads 75*a*.

The cue film C will bear a punch hole corresponding to the initial operation of one of the push buttons P1 and P2 at the time one or the other of the camera stations was first brought into operation to begin the broadcast. When this punch hole passes over drum 100, a plunger, 111*a* or 111*b*, as the case may be, will register therewith and pass through to engage the conductive drum 107, thus forming a circuit to energize either relay 137 or relay 138. Assuming, for example, that the first portion of the broadcast was from camera station S1, accomplished by depression of push button P1, the cue film will bear a punch hole made by punch 21, and accordingly, this punch hole in the cue film will register with a drum-carried plunger 111*a* to close a circuit which will energize relay 138. The result of this energization of relay 137 will be a closing of the circuit leading to solenoid 68, which will operate to open the shutter 67 associated with printer head 60. The energizing circuit for the other shutter 67', associated with printer head 61, will at this time be open, and the shutter will accordingly be closed. Therefore, the sequence photographed on the film in printer head 60 will be printed onto positive film P. At some subsequent time, when a change was made to camera station S2 (this having been accomplished by depression of push button P2), a punch hole was automatically made in the cue film by punch 22; and when this punch hole passes over the drum 100 in control unit 95, it will register with a plunger 111*b*, with the result that a circuit will be made to energize relay 138, thereby closing the circuit to the solenoid 68 associated with the shutter 67' for printer head 61, opening said shutter, while the shutter 67 for the other printer head 60 will automatically close under the influence of its spring 155 as its solenoid 68 is de-energized.

Thus the various scenes or sequences originally picked up by the different sets of television and photographic cameras at the different camera stations will be printed onto the new positive P in accordance with the selection which was made by the dramatic and technical directors for broadcasting over the air. The positive P will be a photographic replica of the program broadcast from the station.

In the event that it should be desired to vary the exact time of shift from one camera position to another in the printing operation, a hole or holes punched automatically in the cue film at the time of the broadcast can be patched over, as for instance by use of any suitable adhesive tape, and substitute holes punched in manually. These will of course have to be located with precision in order to register properly with the contactor plungers of the drum 100.

It will be seen that the usual tedious, time-consuming and expensive cutting room operations have been dispensed with. The cue film C employed to control the printing operations is here shown as marked by a punching operation. It will be understood, however, that this is but illustrative of any suitable way of marking said film, and that any other found feasible, such as photographic, may be substituted if desired. The present disclosure will, in general, be understood as for illustrative purposes only, and the various instrumentalities here only diagrammatically indicated will be understood as merely representative of various forms of physical equipment that may be employed in practice. Various modifications and rearrangements are therefore possible within the broad scope of the invention, as defined by the appended claims.

I claim:

1. The method of television program reproduction, that comprises: training motion picture and television cameras on a field at each of a plurality of camera stations, simultaneously exposing negative films in said motion picture cameras to said field and broadcasting the view picked up by one of said television cameras located at a selected camera station, subsequently from time to time shifting the broadcast from one to another of the views picked up by the television cameras at the different stations, running a control record tape synchronously with the camera films, recording on said control record tape at the time the broadcast begins from the television camera at any given station indicia uniquely designating said station, developing the negative films exposed in said motion picture cameras, running said negatives through a plurality of optical printers capable of printing successively onto a single raw positive film, and selectively controlling said printers to print one at a time from the respective negatives running therethrough onto said positive film in a time sequence determined by said indicia borne by said control tape.

2. The method of television program reproduction, that comprises: training motion picture and television cameras on a field at each of a plurality of camera stations, simultaneously exposing negative films in said motion picture cameras to said field and broadcasting the view picked up by one of said television cameras located at a selected camera station, subsequently from time to time shifting the broadcast from one to another of the views picked up by the television cameras at the different stations, intermittently advancing a control tape past a punching station in synchronism with the travel of the camera films, making station identifying punch holes in said control tape while arrested at said punching station at the time the broadcast begins from the television cameras at the different stations, locating said punch holes in unique positions in the tape so as to uniquely identify particular camera stations, developing the negative films exposed in said motion picture cameras, running said negative through a plurality of optical printers capable of printing successively and in any sequence onto a raw positive film, simultaneously running said punched tape past a control station, and selectively controlling said printers to print one at a time from the respective negatives running therethrough onto said positive film in a sequence determined by the passage of the punch holes in said control tape past said control station.

3. The method of television program reproduction, that comprises: training motion picture and television cameras on a field at each of a plurality of camera stations, simultaneously exposing negative films in said motion picture cameras to said field and broadcasting the view picked up by one of said television cameras located at a selected camera station, subsequently from time to time shifting the broadcast from one to another of the views picked up by the television cameras at the different stations, intermittently advancing a cue film past a punching station in synchronism with the intermittent advance of the negative films in said motion picture cameras, making a punch hole in the film frame arrested at said punching station at the instant the broadcast begins from the television cameras at the different stations, locating the punch holes for different stations in unique positions with respect to said film frame, developing the negative films exposed in said motion picture cameras, running said negatives through a plurality of optical printers capable of printing successively and in any sequence onto a raw positive film, simultaneously running said punched tape past a control station, and selectively controlling said printers to print one at a time from the respective negatives running therethrough onto said positive film in a sequence determined by the passage of the punch holes in said tape past said control station.

4. In a television broadcasting and program reproduction system of the character described, the combination of: a plurality of pairs of synchronously operating television and motion picture cameras located at a plurality of camera stations arranged before a common scene, selector means for effecting broadcasting from any one of said television cameras and for shifting the broadcast from one to another of said cameras, means for advancing a cue tape past a marking station in synchronous relation with the operation of said motion picture cameras, and means controlled by operation of said selector means for automatically marking said tape at said marking station with indicia uniquely designating on the tape the particular television camera from which broadcasting is to be effected, whereby said tape will contain a record of times and sequence of broadcast shifts between television cameras throughout the program.

5. In a television broadcasting and program reproduction system of the character described, the combination of: a plurality of pairs of synchronously operating television and motion picture cameras located at a plurality of camera stations arranged before a common scene, selector means for effecting broadcasting from any one of said television cameras and for shifting the broadcast from one to another of said cameras, means for intermittently advancing a cue film past a marking station in synchronous relation with the operation of the motion picture cameras, punch means located over a film frame position of said cue film for punching holes in an arrested film frame of said cue film in various unique positions, each related to one of said camera stations, and means responsive to operation of said selector means for selectively operating said punch means to punch holes in said arrested film frame in positions uniquely designating the particular television camera from which broadcasting is to be effected, whereby said film will contain punch holes designating by their positions along the cue film, and by their positions within the film frames, the times and sequence, respectively, of broadcast shifts between television cameras throughout the program.

6. The method of television program reproduction, that comprises: training motion picture and television cameras on a field at each of a plurality of camera stations, simultaneously exposing negative films in said motion picture cameras to said field and broadcasting the view picked up by one of said television cameras located at a selected camera station, subsequently from time to time shifting the broadcast from one to another of the views picked up by the television cameras at the different stations, running a record tape past a recording station synchronously with the camera films, recording on said record at the time the broadcast begins from the television camera at any given camera station indicia uniquely designating said station, developing the negative films exposed in said motion picture cameras, running said negatives through a plurality of optical printers capable of printing successively onto a single raw positive film, simultaneously running said tape past a control station, and selectively controlling said printers to print one at a time from the respective negatives running therethrough onto said positive film in a sequence determined by the passage of said indicia on said tape past said control station.

7. The method of preparing a television program film to correspond with successive sequences viewed from different successively selected camera stations, that comprises: training motion picture and television cameras on a field at each of a plurality of camera stations, simultaneously exposing negative film in said motion picture cameras and operating said television cameras, reproducing the views picked up by said television cameras on viewing screens, simultaneously therewith running a record medium past a fixed recording station in synchronism with the camera films, from time to time selecting a different one of said camera stations and at such times recording on said record medium at said recording station indicia uniquely designating the selected station, and printing from the corresponding developed negative films one at a time onto a single raw positive film in a sequence determined by indicia borne by said record tape and with changes between said negative films timed in accordance with occurrence of said recorded indicia along said record medium.

8. The method of preparing a television program film to correspond with successive sequences viewed from different successively selected camera stations, that comprises: training motion picture and television cameras on a field at each of a plurality of camera stations, simultaneously exposing negative film in said motion picture cameras and operating said television cameras, reproducing the views picked up by said television cameras on viewing screens, intermittently advancing a cue film past a punching station in synchronism with the camera films, from time to time selecting a different one of said camera stations and on each such instance making a punch hole in an arrested frame of said cue film at said punching station, locating said punch holes in different positions in the arrested film frame for different camera stations, whereby a punch hole uniquely identifies, by its position in the film frame, one particular camera station, the punched film frames in the cue film representing times of change between camera stations, running the corresponding developed negative films through a plurality of printers capable of printing selectively and successively onto a single raw positive film, simultaneously running the punched cue film past a control station, and selectively operating said printers to print from said negatives one at a time onto said raw positive film in accordance with passage of corresponding negative-identifying punch holes past said control station.

References Cited in the file of this patent

UNITED STATES PATENTS

| | | |
|---|---|---|
| 1,591,081 | Curtis | July 6, 1926 |
| 1,810,002 | Arnold | June 16, 1931 |
| 1,926,879 | Miller | Sept. 13, 1933 |
| 1,948,319 | Spence | Feb. 20, 1934 |
| 2,164,176 | Goldsmith | June 27, 1939 |
| 2,164,297 | Bedford | June 27, 1939 |
| 2,210,497 | Perceval | Aug. 6, 1940 |
| 2,272,043 | Browne | Feb. 3, 1942 |
| 2,282,957 | Fields | May 12, 1942 |
| 2,291,613 | Dye | Aug. 4, 1942 |
| 2,385,861 | Jones | Oct. 2, 1945 |
| 2,402,095 | Slyfield | June 11, 1946 |
| 2,420,197 | Rosenthal | May 6, 1947 |

FOREIGN PATENTS

| | | |
|---|---|---|
| 509,776 | Great Britain | July 20, 1939 |